Patented Jan. 16, 1951

2,537,981

UNITED STATES PATENT OFFICE 2,537,981

METHOD OF PRODUCING A GLYCIDYL ESTER

Phyllis Edwards, Stamford, Conn., assignor to American Cyanamid Company, New York, N. Y., a corporation of Maine No Drawing. Application October 28, 1949, Serial No. 124,250

14 Claims. (Cl. 260—348)

This invention relates to certain new and useful improvements in the preparation of glycidyl esters, more particularly glycidyl esters of an ethylenically unsaturated monocarboxylic acid. Specifically the invention is concerned with the method of preparing a glycidyl ester of an unsaturated monocarboxylic acid which comprises effecting reaction under heat between an alkali-metal salt of an ethylenically unsaturated monocarboxylic acid (e. g., sodium acrylate, potassium methacrylate, potassium crotonate, etc.) and epichlorohydrin while admixed with a quaternary ammonium salt as a catalyst for the reaction. The quaternary ammonium salt which is used as a catalyst in carrying the present invention into effect can be represented by the general formula

I                $R(CH_3)_3NX$ where R represents a radical selected from the class consisting of alkyl and aralkyl radicals, and X represents the anion of an inorganic acid. Thereafter the glycidyl ester produced by the reaction is isolated, e. g., by distillation, from the resulting reaction mass.

Illustrative examples of radicals which R in the aforementioned formula for the quaternary ammonium salt can represent are: methyl, ethyl, propyl, isopropyl, n-butyl, sec.-butyl, tert.-butyl, amyl, isoamyl, hexyl, heptyl, octyl, nonyl, decyl, dodecyl to octadecyl, inclusive, benzyl, phenylethyl, phenylpropyl, phenyl-isopropyl, phenyl-n-butyl, phenylamyl, etc. Illustrative examples of anions of inorganic acids which X in the above formula can represent are: chloride ions, bromide ions, iodide ions, fluoride ions, sulfate ions, nitrate ions, phosphate ions, etc. The chemical names of specific examples of quaternary ammonium salts useful in practicing the present invention will be apparent to those skilled in the art from the above general formula and from the foregoing examples of radicals and anions which R and X, respectively, in this formula can represent.

Numerous methods of making various glycidyl esters were known or suggested prior to my invention (see, for example, U. S. Patent No. 2,252,039 which discloses various methods of making a particular class of glycidyl esters). Because of the reactive epoxy grouping which such esters contain, it is considerably more difficult to prepare and isolate them in good yields than is encountered in the production of the simple, inert or relatively inactive esters. In the copending application of John G. Erickson, Serial No. 34,141, filed June 19, 1948, is described and claimed a method of preparing a glycidyl ester by dehydrohalogenation of a compound represented by the general formula II      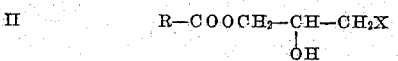

where R represents a monovalent hydrocarbon radical and X represents either chlorine or bromine. The dehydrohalogenation of the 2-hydroxy-3-halogenopropyl ester represented by the above formula is effected by contacting it with a base of a particular kind, specifically an alkali-metal alkoxide or a hydroxide of an alkali metal or of an alkaline-earth metal. Another method of preparing glycidyl esters, specifically glycidyl acrylate, glycidyl methacrylate and glycidyl crotonate, comprises effecting reaction between an alkali-metal salt of a monocarboxylic acid corresponding to the ester desired and epichlorohydrin as more fully described in the copending application of John G. Erickson, Serial No. 34,142, also filed June 19, 1948. The present invention is an improvement upon the method described in the last-named Erickson application, and upon a method heretofore suggested for the preparation of glycidyl sorbate by effecting reaction between potassium sorbate and epichlorohydrin at the boiling temperature of the epichlorohydrin and in the presence of a small amount of a tertiary amine catalyst, specifically triethylamine, tributylamine, N-methyl morpholine, ethyl morpholine and pyridine.

It is a primary object of the present invention to provide a rapid and economical method of preparing glycidyl esters of acrylic, methacrylic, ethacrylic, propacrylic, phenylacrylic (cinnamic), crotonic, oleic, sorbic, linoleic, linolenic, and other ethylenically unsaturated monocarboxylic acids, whereby high yields of such esters are obtained after a relatively short reaction period (e. g., from 10 minutes to 1 or 1½ hours), and formation of polymer is reduced to a minimum.

Another object of the invention is to improve the method of preparing glycidyl esters by reaction between epichlorohydrin and an alkali-metal salt of an ethylenically unsaturated monocarboxylic acid by using a catalyst for the reaction which greatly accelerates the rate of reaction, shortening the time of reaction as compared with the reaction periods required with catalysts heretofore suggested for use, so that a continuous method of producing the esters is feasible.

These and other objects are attained by practicing the method and using the catalyst briefly described in the first paragraph of this specification and more fully hereinafter.

The present invention is based on my discovery that a quaternary ammonium salt of the kind embraced by Formula I is capable of accelerating reaction between epichlorohydrin and an alkali-metal salt of an ethylenically unsaturated monocarboxylic acid so that the rate of the reaction is as much as two hundred times and more that of the reaction rate between these reactants in the absence of such a quaternary ammonium salt and with other reaction conditions the same. As will be readily apparent to those skilled in the art, this is a matter of considerable practical importance since it makes possible the production of a particular amount of glycidyl ester in a shorter period of time than heretofore has been possible; or, for a given size of reaction vessel, increases the amount of glycidyl ester which can be produced in that vessel and thereby materially reduces the cost of producing a given weight unit of the ester. Another advantage accruing from my invention resides in the fact that it makes possible the use of temperatures materially below the boiling temperature of epichlorohydrin, without much if any sacrifice of yield, and thus decreases the explosive hazards frequently encountered in the use of epichlorohydrin as a reactant in the production of glycidyl esters.

Any suitable method may be employed in producing the alkali-metal salts of ethylenically unsaturated monocarboxylic acids which are used in practicing my invention. I have found that the salts of acrylic acid are best prepared by neutralization of acrylic acid in alcohol solution, whereupon the salt is formed as a precipitate and can be readily filtered from the supernatant liquid. The salts of methacrylic acid can be prepared conveniently by saponification of methyl methacrylate in ethyl or isopropyl alcohol. Other salts usually can be prepared quite readily by neutralizing the ethylenically unsaturated monocarboxylic acid with an aqueous solution of potassium or other alkali-metal hydroxide and then evaporating the resulting solution to dryness. The wet salt can be dried at any suitable temperature, but air drying at room temperature generally yields a salt which is sufficiently dry for use in the process.

In general, the alkali-metal salt of the ethylenically unsaturated monocarboxylic acid and the epichlorohydrin are used in the ratio of 1 mole of the former to at least 1 mole of the latter. Preferably the epichlorohydrin is used in excess of equimolecular proportions, e. g., in the ratio of, say, 1.05 or 1.1 to 1.5, 2, 3, 4 or 5 moles of epichlorohydrin per mole of potassium or other alkali-metal salt of the ethylenically unsaturated monocarboxylic acid. If desired, the epichlorohydrin can be employed in higher molar ratios, e. g., in the ratio of 10 or 15 or even as much as 20 or 30 or more moles of epichlorohydrin per mole of the alkali-metal salt. The excess of epichlorohydrin over equal molecular proportions merely acts as a solvent medium in which the reaction is effected, from which it will be seen that the maximum amount of epichlorohydrin used is governed only by practical considerations of processing economy. Usually it is desirable to employ the epichlorohydrin in an amount corresponding to at least 5 or 10 mole per cent in excess of equimolecular proportions.

Instead of using an excess of epichlorohydrin over equimolecular proportions as a diluent or solvent medium in which the reaction is effected, I may use various other media either alone or in conjunction with excess epichlorohydrin as the reaction medium. Illustrative examples of media in which the reaction can be effected are liquid hydrocarbons (e. g., benzene, toluene, xylene, hexane, heptane, octane, nonane, etc.), dioxane, ethers (e. g., diethyl ether, dipropyl ether, dibutyl ether, anisole, phenetole, etc.), ketones (e. g., acetone, diethyl ketone, dipropyl ketone, dibutyl ketone, methyl ethyl ketone, methyl propyl ketone, ethyl butyl ketone, acetophenone, etc.), alcohols, more particularly tertiary monohydric alcohols (e. g., tert.-butyl alcohol, tert.-amyl alcohol, etc.), sulfolane, acetonitrile, succinonitrile, dimethylformamide, as well as others. The diluent or solvent is preferably one in which the glycidyl ester is inert or relatively inert, so that optimum yield of the product may be obtained; and preferably, also, is a volatile one which has a boiling point or range which is different (i. e., either higher or lower) than the glycidyl ester resulting from the reaction in order that the latter more readily may be isolated, as by distillation, from the reaction mass.

If the reaction be effected in the presence of a diluent or solvent medium, the amount of the latter may be varied as desired or as conditions may require. For instance, the amount of alkali-metal salt of the ethylenically unsaturated monocarboxylic acid and epichlorohydrin can be from about 5% to about 95% by weight of the reaction mass, the diluent or solvent (preferably one which is liquid at least at the reaction temperature) constituting the remainder. If a diluent or solvent medium be used, it is generally employed in an amount corresponding to from about 0.1 to about 20 times (e. g., from 1 to 5 or 6 times) the volume of the alkali-metal salt plus epichlorohydrin used, depending, for instance, upon the particular alkali-metal salt and the particular reaction medium employed.

The amount of quaternary ammonium salt of the kind embraced by Formula I which is used in practicing the present invention can be varied widely, ranging, for example, from merely a trace or 0.01% to 4 or 5% or more by weight of the alkali-metal salt. No particular advantage accrues from using an amount of catalyst which is in excess of that required to obtain optimum acceleration of the reaction between the alkali-metal salt and epichlorohydrin consistent with optimum yield of glycidyl ester. Ordinarily the quaternary ammonium salt is used in an amount corresponding to from 0.001 to 0.1 (e. g., approximately 0.025) mole of catalyst per mole of alkali-metal salt.

The temperature of the reaction can be widely varied as desired or as conditions may require, but generally reaction is effected between the epichlorohydrin and the alkali-metal salt, e. g., potassium methacrylate, by heating a mixture of the said reactants at a temperature within the range of from about 50° C. to the boiling temperature of the reaction mass. As has been indicated hereinbefore, it is advantageous from a safety standpoint to carry out the reaction at a temperature below the boiling point of the epichlorohydrin, e. g., at a temperature of from about 85° C. to about 100° C., in order to reduce to a minimum the explosive hazards frequently encountered when employing epichlorohydrin as a reactant at its boiling point. In general, the lower the temperature of reaction, the longer is the reaction period when other conditions are the same.

The glycidyl ester resulting from the reaction between the alkali-metal salt of the ethylenically unsaturated monocarboxylic acid and epichlorohydrin may be isolated from the reaction mass in any suitable manner, e. g., by extraction with a suitable solvent or by distillation. Usually the reaction mass is filtered to separate the salt formed by reaction between the alkali metal of the salt of the monocarboxylic acid and the chlorine of the epichlorohydrin, as well as any other undesired solids that may be present. If the reaction was not effected in a liquid medium, a suitable liquid diluent or solvent can be added to the reaction mass to facilitate filtration; or, if the amount of liquid diluent or solvent present in the reaction mass is insufficient for ease of filtration of the mass, an additional amount of liquid diluent or solvent can be added to facilitate filtration. The glycidyl ester then can be separated from the filtrate by distillation (under reduced pressure if necessary or advisable), if it has a lower boiling point than the liquid diluent or solvent which is present in the filtrate; or by distilling off the latter if its boiling point is lower than that of the glycidyl ester.

In preparing glycidyl esters of an ethylenically unsaturated monocarboxylic acid in accordance with my invention it is usually desirable, in order to obtain an optimum yield of the ester, to effect the reaction between the alkali-metal salt and epichlorohydrin not only in the presence of a quaternary ammonium salt of the kind embraced by Formula I but also in the presence of a material which is adapted to inhibit polymerization through the ethylenically unsaturated grouping, more particularly a vinyl-type polymerization inhibitor. In this way the formation of polymeric material during the reaction period is obviated or minimized. Any suitable polymerization inhibitor of the aforementioned type or kind may be employed, e. g., phenyl-$\alpha$-naphthylamine, N,N'-di-2-naphthyl-p-phenylenediamine, finely divided copper, certain cupric salts, e. g., cupric acetate, etc. The amount of the polymerization inhibitor may be considerably varied, but ordinarily it is employed in an amount not exceeding 3%, generally less than 1%, by weight of the alkali-metal salt of the ethylenically unsaturated monocarboxylic acid, e. g., from 0.01% to 0.5 or 0.6% by weight of the said ester.

In order that those skilled in the art better may understand how the present invention can be carried into effect, the following examples are given by way of illustration and not by way of limitation. All parts and percentages are by weight.

*Example 1*

This example and Examples 2 to 9, inclusive, illustrate the preparation of glycidyl methacrylate (B. P. 85° C. at 15 mm. pressure, $n_D^{25°}$ 1.4476, $D_{25°}$ 1.074) in accordance with my invention.

| | Parts |
|---|---|
| Potassium methacrylate | 125.0 |
| Epichlorohydrin | 1000.0 |
| N,N'-di-2-naphthyl-p-phenylenediamine (polymerization inhibitor) | 2.0 |
| Tetramethylammonium chloride (catalyst) | 0.68 |

A mixture of the above ingredients was heated with stirring for 1 hour at 95°–98° C. After cooling, the reaction mass was filtered and the separated solids (mainly potassium chloride) were washed with acetone. The more volatile liquids were distilled from the combined filtrate and washings under reduced pressure, after which the glycidyl methacrylate resulting from the reaction also was distilled off under reduced pressure. The amount of polymer (polymeric glycidyl methacrylate) produced during the reaction and subsequent distillation amounted to 8.2 parts. The yield of glycidyl methacrylate upon redistillation of the crude product amounted to 129.7 parts, which represents a conversion of 91.3% of theoretic, based on the alkali-metal salt of the ethylenically unsaturated monocarboxylic acid (specifically potassium methacrylate in this example), as are all of the conversions mentioned in subsequent examples. Nine-tenths (0.9) part of potassium methacrylate was unreacted.

*Example 2*

The formulation was exactly the same as described under Example 1. The mixture of the ingredients was heated with stirring under reflux at 117° C. for 0.33 hour. Otherwise the procedure was essentially the same as that given under Example 1. The amount of polymer resulting from the primary distillation was 6.1 parts. Redistillation of the crude glycidyl methacrylate yielded 132.7 parts of purified material, which corresponds to a conversion of 93.4% of theoretic. The unreacted potassium methacrylate amounted to 1.3 parts.

*Example 3*

| | Parts |
|---|---|
| Potassium methacrylate | 125.0 |
| Epichlorohydrin | 1000.0 |
| N,N'-di-2-naphthyl-p-phenylenediamine | 2.0 |
| Benzyltrimethylammonium chloride (catalyst) | 1.16 | were heated together with stirring at 116° C. for 0.22 hour. The subsequent procedure was essentially the same as that described under Example 1. The amount of polymer produced was 5.1 parts. Redistillation of the crude glycidyl methacrylate yielded 128.3 parts of purified material. This corresponds to a conversion of 90.5% of theoretic. The amount of unreacted potassium methacrylate was 0.9 part.

*Example 4*

The formulation and procedure were exactly the same as described under Example 3 with the exception that the mixture of ingredients was heated with stirring for 0.58 hour at 95°–98° C. The amount of polymer which formed was 7.2 parts. The yield of redistilled glycidyl methacrylate was 127.6 parts, which corresponds to a conversion of 89.9% of theoretic. The amount of unreacted potassium methacrylate was 0.9 part.

*Example 5*

This example illustrates the results obtained when the amount of catalyst is increased.

The formulation and general procedure were the same as that described under Example 4 with the exception that 2.32 parts (instead of 1.16 parts as in Example 4) of benzyltrimethylammonium chloride was used. The mixture of ingredients was heated with stirring for 0.28 hour at 95°–98° C. The polymer which formed amounted to 7.0 parts. Redistillation of the crude glycidyl methacrylate yielded 129.3 parts of purer material, which corresponds to a conversion of 92.3% of the theoretical amount. The amount of unreacted potassium methacrylate was 0.6 part.

Example 6

This example illustrates the results obtained when the amount of catalyst is further increased above that employed in Examples 4 and 5.

The formulation and general procedure were the same as that employed in Example 4 with the exception that, instead of 1.16 parts of benzyltrimethylammonium chloride, there was used 4.64 parts of this catalyst. The mixture of ingredients was heated together with stirring for 0.17 hour at 95°–98° C. The amount of polymer which remained as a residue was 4.1 parts. Redistillation of the crude glycidyl methacrylate yielded 131.1 parts of purer material, which represents a conversion of 93.2% of the theoretical amount. The unreacted potassium methacrylate amounted to 0.5 part.

Example 7

|  | Parts |
|---|---|
| Potassium methacrylate | 125.0 |
| Epichlorohydrin | 500.0 |
| N,N'-di-2-naphthyl-p-phenylenediamine | 1.0 |
| Benzyltrimethylammonium chloride | 4.64 | were heated together with stirring for 0.22 hour at 95°–98° C. The subsequent procedure was essentially the same as that described under Example 1. The amount of polymer formed was 7.6 parts. The yield of redistilled glycidyl methacrylate was 125 parts, which corresponds to a conversion of 89.1% of theoretic. The amount of unreacted potassium methacrylate was 2.1 parts.

Example 8

|  | Parts |
|---|---|
| Potassium methacrylate | 125.0 |
| Epichlorohydrin | 1000.0 |
| N,N'-di-2-naphthyl-p-phenylenediamine | 2.0 |
| Benzyltrimethylammonium sulfate | 2.97 | were heated together with stirring for 0.38 hour at 95°–98° C., the subsequent procedure being essentially the same as that followed in Example 1 and the other examples. Seven and one-tenth (7.1) parts of polymer was formed. The amount of purified glycidyl methacrylate obtained by redistillation of the crude product was 126.5 parts, which corresponds to a conversion of 89.1% of the theoretical amount. The unreacted potassium methacrylate amounted to 0.4 part.

Example 9

The same formulation and essentially the same procedure were followed in this example as that employed in Example 8 with the exception that, instead of 2.97 parts of benzyltrimethylammonium sulfate as a catalyst, there was used 4.86 parts of octadecyltrimethylammonium bromide, and the time of heating at 95°–98° C. was 0.25 hour. The amount of polymer formed was 7.8 parts. Upon redistillation of the crude glycidyl methacrylate there was obtained 123.2 parts of purified material, which corresponds to a conversion of 86.8% of theoretic. The amount of unreacted potassium methacrylate was 2.3 parts.

Example 10

Same as in Example 1 with the exception that, instead of 125 parts of potassium methacrylate, there is used 111 parts of potassium acrylate. Similar results are obtained. The product, glycidyl acrylate, is a colorless liquid, B. P. 115° C. at 78 mm. pressure, $n_D^{20°}$ 1.4472, $d_4^{20°}$ 1.0993.

Example 11

Same as in Example 1 with the exception that, instead of 125 parts of potassium methacrylate, there is employed 125 parts of potassium crotonate. Similar results are obtained. The product, glycidyl crotonate, is a liquid, B. P. 102°–104° C. at 18 mm. pressure, $n_D^{25°}$ 1.4568.

Example 12

Same as in Example 1 with the exception that only 138.8 parts of epichlorohydrin (molar ratio of about 1.5 moles of epichlorohydrin per mole of potassium methacrylate) is used, 500 parts of dimethylformamide is employed as a solvent (in addition to the excess epichlorohydrin), and the reaction mass is maintained at 80° C. Similar results are obtained.

Instead of using the potassium salt of an ethylenically unsaturated monocarboxylic acid, specifically potassium acrylate, potassium methacrylate or potassium crotonate, as described in the above examples, any of the other alkali-metal salts of an ethylenically unsaturated monocarboxylic acid can be used, e. g., the sodium, lithium, caesium or rubidium salts of such acids.

Example 13

This example illustrates the results obtained when reaction is effected between epichlorohydrin and potassium methacrylate in the absence of a catalyst for the reaction.

|  | Parts |
|---|---|
| Potassium methacrylate | 125 |
| Epichlorohydrin | 1000 |
| N,N'-di-2-naphthyl-p-phenylenediamine | 2 | were heated together under reflux with stirring for 30 hours at 118° C. The subsequent procedure was the same as that followed in the other examples. The amount of polymer which formed was 12.8 parts. Redistillation of the crude glycidyl methacrylate yielded 117.4 parts of purified material, which corresponds to a conversion of 82.7% of the theoretical amount. The amount of unreacted potassium methacrylate was 0.8 part.

Example 14

This example illustrates the results obtained when reaction is effected between potassium methacrylate and epichlorohydrin using a tertiary amine, specifically triethylamine, as a catalyst for the reaction.

|  | Parts |
|---|---|
| Potassium methacrylate | 125.0 |
| Epichlorohydrin | 1000.0 |
| N,N''-di-2-naphthyl-p-phenylenediamine | 1.0 |
| Triethylamine | 1.25 | were heated together with stirring under reflux for 1.09 hours at 95°–98° C. The other steps were the same as those employed in the prior examples. The amount of polymer which formed was 14.3 parts. Upon redistillation of the crude glycidyl methacrylate there was obtained 119.7 parts of purified ester, which corresponds to a conversion of 84.4% of the theoretical amount. The amount of unreacted potassium methacrylate was 1 part.

It will be understood, of course, by those skilled in the art that my invention is not limited to the particular alkali-metal salts of ethylenically (monoethylenically or polyethylenically) unsaturated monocarboxylic acids, to the particular quaternary ammonium salts, to the particular reaction media, reaction temperatures, reaction periods, proportions of ingredients, or other conditions employed in the above illustrative examples. Thus, instead of the potassium salts of acrylic, methacrylic and crotonic acids, I can use the sodium, lithium or any of the other alkali-metal salts of these acids, or, depending upon the particular glycidyl ester desired, the potassium, sodium, lithium, rubidium or caesium salts of any of the other available ethylenically unsaturated monocarboxylic acids alone; or alkali-metal salts of mixtures of such acids, or of mixtures thereof with saturated monocarboxylic acids, or with saturated and/or ethylenically unsaturated polycarboxylic acids; or alkali-metal salts of mixtures of ethylenically unsaturated monocarboxylic acids and saturated monocarboxylic acids together with a saturated and/or an ethylenically unsaturated polycarboxylic acid. When alkali-metal salts of mixed carboxylic acids are employed, the product can be collected in the form of a mixture of glycidyl esters. Preferably a potassium salt is employed, because of the somewhat better solubility characteristics which such salts generally possess as compared with other alkali-metal salts of ethylenically unsaturated monocarboxylic acids.

Likewise, instead of the particular quaternary ammonium salts employed in the various examples, any of the other quaternary ammonium salts of the kind embraced by Formula I, numerous examples of which have been given hereinbefore, can be used. A more limited class of such salts which, for economic and other reasons, advantageously can be employed in practicing my invention, are those represented by the formula III  R(CH₃)₃NCl where R represents a radical selected from the class consisting of alkyl and aralkyl radicals, numerous examples of which radicals have been given hereinbefore with reference to Formula I. Good results have been obtained with quaternary ammonium salts embraced by Formula III wherein R represents an alkyl, preferably a methyl, radical.

It also will be understood that other diluent or solvent or dispersion media can be employed instead of excess epichlorohydrin or dimethylformamide, numerous examples of which media have been given hereinbefore; or, although not generally desirable from a practical standpoint, the reaction can be effected, if desired, in the absence of a solvent or diluent or dispersion medium.

Polymerization inhibitors other than N,N'-di-2-naphthyl-p-phenylenediamine, which was employed in the various examples, can be used, for instance inhibitors such as were mentioned hereinbefore by way of illustration. The process is operative without the use of a polymerization inhibitor, but in general the yield of monomeric ester is higher (other conditions being the same) when a polymerization inhibitor is used.

In many cases it is advantageous to carry out the reaction in an inert atmosphere, for example by maintaining the reaction mass during all or a part of the reaction period under an atmosphere of an inert gas such, for instance, as nitrogen, carbon dioxide, argon, helium, etc. The reaction can be effected under atmospheric, subatmospheric or superatmospheric pressures.

The quaternary ammonium salts employed in practicing the present invention also may be used as a catalyst in similarly preparing, from epichlorohydrin and the corresponding alkali-metal salt of the acid, glycidyl esters of saturated monocarboxylic acids and of saturated or ethylenically unsaturated polycarboxylic acids.

I claim:
1. The method of preparing a glycidyl ester of an ethylenically unsaturated monocarboxylic acid which comprises effecting reaction under heat between an alkali-metal salt of an ethylenically unsaturated monocarboxylic acid and epichlorohydrin while admixed with a quaternary ammonium salt as a catalyst for the reaction, said salt being represented by the general formula

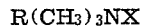 R(CH₃)₃NX where R represents a radical selected from the class consisting of alkyl and aralkyl radicals, and X represents the anion of an inorganic acid, and isolating the resulting glycidyl ester from the reaction mass.

2. A method as in claim 1 wherein X represents a chloride ion.

3. A method as in claim 1 wherein X represents a bromide ion.

4. A method as in claim 1 wherein X represents a sulfate ion.

5. A method as in claim 1 wherein the alkali-metal salt of an ethylenically unsaturated monocarboxylic acid is a potassium salt of an ethylenically unsaturated monocarboxylic acid.

6. A method as in claim 1 wherein the reaction is effected in the presence of a liquid diluent.

7. A method as in claim 1 wherein the alkali-metal salt of an ethylenically unsaturated monocarboxylic acid and epichlorohydrin are employed in a molar ratio of 1 mole of the former to substantially more than 1 mole of the latter.

8. A method as in claim 1 wherein the quaternary ammonium salt is tetramethylammonium chloride.

9. A method as in claim 1 wherein the quaternary ammonium salt is benzyltrimethylammonium chloride.

10. A method as in claim 1 wherein the quaternary ammonium salt is benzyltrimethylammonium sulfate.

11. A method as in claim 1 wherein the quaternary ammonium salt is octadecyltrimethylammonium bromide.

12. The method of preparing glycidyl methacrylate which comprises effecting reaction, by heating at a temperature within the range of from 50° C. to the boiling temperature of the reaction mass, a mixture consisting essentially of potassium methacrylate and epichlorohydrin in a molar ratio of 1 mole of the former to substantially more than 1 mole of the latter, and, as a catalyst for the reaction, a small amount of a quaternary ammonium salt represented by the formula

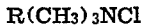 R(CH₃)₃NCl where R represents a radical selected from the class consisting of alkyl and aralkyl radicals, removing the potassium chloride by-product of the reaction from the reaction mass, and distilling the resulting mass to separate glycidyl methacrylate therefrom.

13. A method as in claim 12 wherein R in the formula for the quaternary ammonium salt represents an alkyl radical.

14. A method as in claim 13 wherein the alkyl radical is a methyl radical.

PHYLLIS EDWARDS.

No references cited.